United States Patent
Tran et al.

(10) Patent No.: US 6,658,042 B1
(45) Date of Patent: Dec. 2, 2003

(54) METHOD AND APPARATUS FOR TIME TRACKING A SIGNAL USING HARDWARE AND SOFTWARE

(75) Inventors: Howard (Hau) Thien Tran, Downey, CA (US); John G. McDonough, La Jolla, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/405,377

(22) Filed: Sep. 24, 1999

(51) Int. Cl.[7] ................................................ H04B 1/69
(52) U.S. Cl. .................. 375/130; 375/149; 375/148; 375/147; 375/145; 375/137; 375/246; 375/253; 375/325; 375/326; 375/347
(58) Field of Search .................. 375/130, 149, 375/148, 147, 145, 137, 246, 253, 325, 326, 342

(56) References Cited

U.S. PATENT DOCUMENTS

| | | | | |
|---|---|---|---|---|
| 4,841,544 A | | 6/1989 | Nuytkens ........................ 375/1 |
| 5,097,459 A | * | 3/1992 | Yoshio ....................... 369/47.29 |
| 5,223,656 A | * | 6/1993 | Higashi ........................ 84/661 |
| 5,414,729 A | * | 5/1995 | Fenton ......................... 375/149 |
| 5,799,010 A | * | 8/1998 | Lomp et al. .................. 370/335 |
| 5,867,525 A | | 2/1999 | Giallorenzi et al. ......... 375/206 |

FOREIGN PATENT DOCUMENTS

EP 496354 A2 7/1992 .............. G01S/5/14

* cited by examiner

Primary Examiner—Stephen Chin
Assistant Examiner—Guillermo Muñoz
(74) Attorney, Agent, or Firm—Peter Zawilski (57) ABSTRACT

A method of providing time tracking between a first signal and a second signal in a communication device. In one embodiment, a first signal is generated by the communication device and a second signal is received from an outside source. Then correlation data between a first signal, at a plurality of timing conditions, and a second signal is generated by hardware. Next, the correlation data is filtered by software or firmware at a plurality of timing conditions. Afterward, the correlation data is compared to a threshold value to evaluate accuracy of a system timing for the first signal to obtain a result. Finally, the system timing for the first signal is corrected based upon said result of the comparing step.

18 Claims, 9 Drawing Sheets

METHOD AND APPARATUS FOR TIME TRACKING A SIGNAL USING HARDWARE AND SOFTWARE

TECHNICAL FIELD

The present claimed invention relates to the field of digital communication. Specifically, the present claimed invention relates to an apparatus and a method for providing time tracking of a signal using hardware and software.

BACKGROUND ART

Wireless telephony, e.g. cellular phone use, is a widely-used mode of communication today. Variable rate communication systems, such as Code Division Multiple Access (CDMA) spread spectrum systems, are among the most commonly deployed wireless technology. Because of increasing demand and limited resources, a need arises to improve their capacity, fidelity, and performance.

Figure 1A:
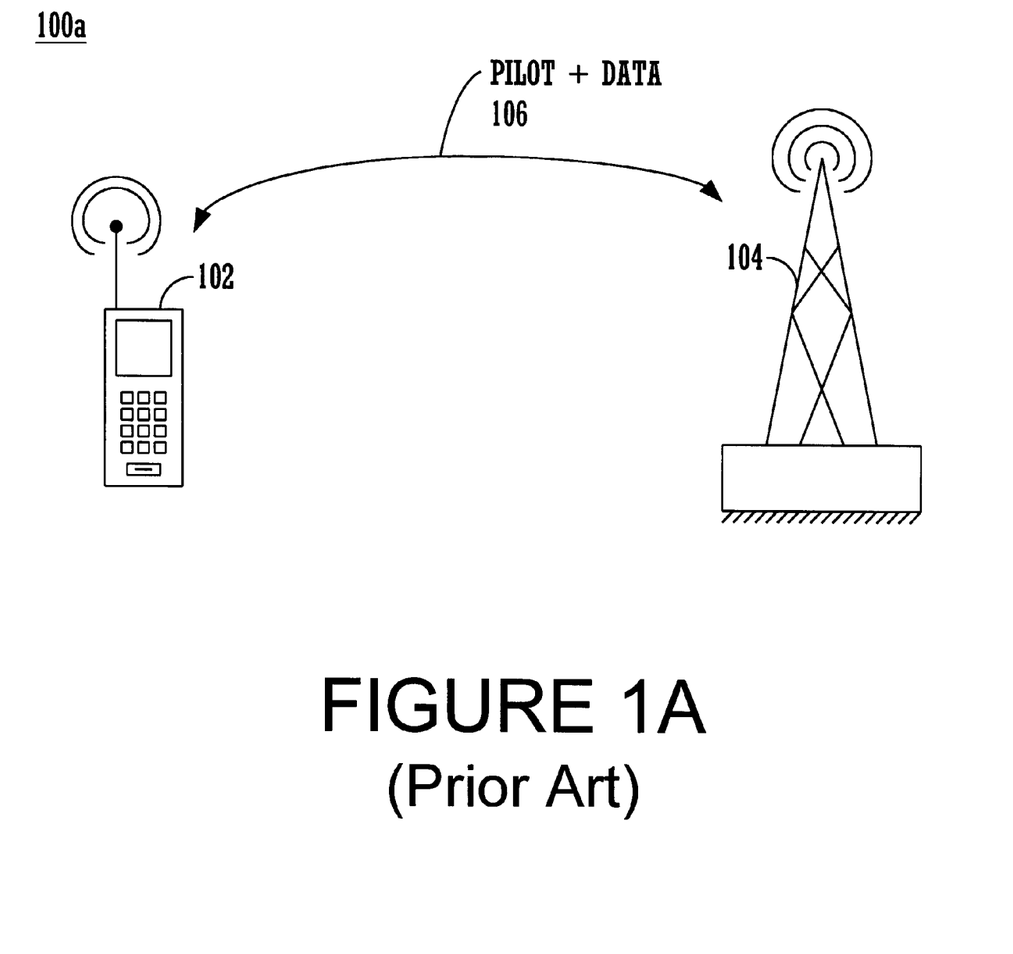
FIG. 1A is an illustration of a conventional base station and cell phone.

Referring to prior art FIG. 1A, a conventional base station 104 and a mobile unit 102, e.g. a cell phone, are shown. A CDMA system uses a common bandwidth to transmit the pilot signal and a data signal 106 between a base station 104 and a mobile unit 102, for multiple users. Hence, the bandwidth is occupied by an amalgam of many signals. In order to extract an individual signal from the amalgam of signals, the individual signal is modulated at the transmitter and demodulated at the receiver.

Figure 1B:
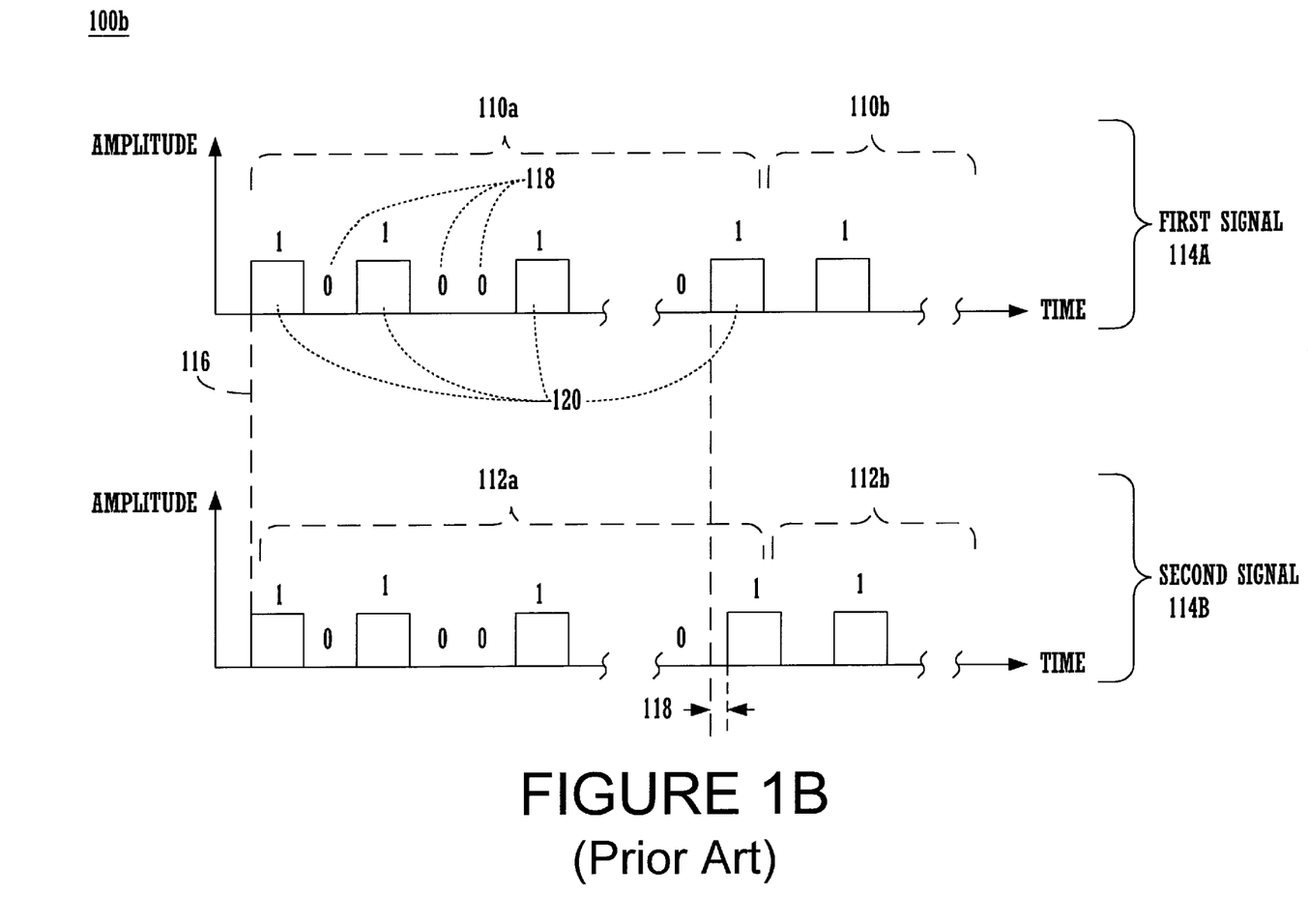
FIG. 1B is an illustration of two conventional signals having a conventional PN sequence.

Referring now to prior art FIG. 1B, two signals having an exemplary PN sequence 100b are shown. The modulation code used for CDMA is a pseudonoise (PN), e.g. an apparently random sequence of 1's 120 and 0's 118 having a given length, e.g. 110a. A "long" PN sequence is used to scramble user data, while a "short" PN sequence is used to spread quadrature components for the forward and reverse link wave forms.

The short PN sequence is used for a pilot signal. A base station broadcasts a pilot signal to which a mobile receiver may receive and synchronize, for time tracking purposes. Thus, as shown in prior art FIG. 1B, a first signal 114a of a conventional PN sequence, e.g. 110a, is repeatedly generated, e.g. 110b, by a first device such as a mobile unit 102 of prior art FIG. 1A. Similarly, the same conventional PN sequence, e.g. 112a, is repeatedly generated, e.g. 112b, by a second device such as a base station 104 of prior art FIG. 1A.

The mobile unit and base station can communicate to each other when they properly align the starting points of the known PN sequence. Proper alignment is utterly critical, in-applications such as CDMA, because it is necessary for accurately applying the PN sequence to demodulate a signal out of the amalgam of signals that occupy the bandwidth. While a signal may be correctly aligned at the beginning of the signal, e.g. 116, it may not be properly aligned throughout the entire signal, e.g. offset error 118, as shown in prior art FIG. 1A. The misalignment can arise from a difference in the frequency $V_{cxo}$ of the PN sequence generated at each unit. This is referred to as a frequency offset between a base station and a mobile unit. Hence a need arises for time tracking a signal generated by one device with a signal received from another device to ensure proper alignment of the signals for modulation and demodulation.

Determining the alignment of the signals can be accomplished by performing digital signal processing (DSP), such as a correlation operation, on the signals. However, imperfections in transmitting, receiving, modulating, and demodulating a signal, inherently integrate noise into the signal. The noise hampers, and sometimes prevents, the DSP operation to demodulate a signal and receive the data contained therein. To improve the time tracking operation, a need arises to remove the noise from the correlation data used for time tracking.

Figure 1C:
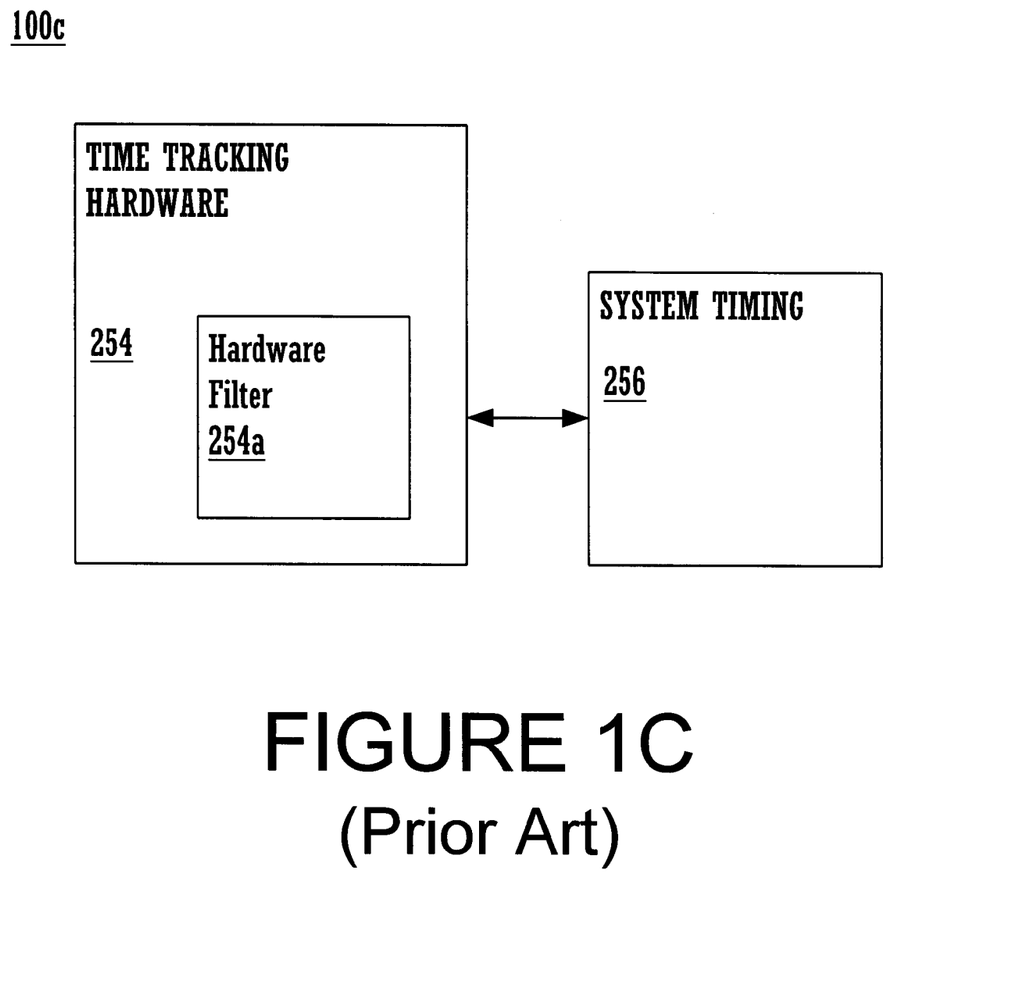
FIG. 1C is a block diagram of a conventional time tracking device.

Referring now to prior art FIG. 1C, a conventional time tracking block diagram is shown. Conventional time tracking uses hardware 254 to perform the time tracking operations and provide input to system timing 256. Conventionally, the time tracking hardware removes noise from the signal by passing the signal through a hardware filter 254a. However, by using hardware, the conventional filter 254a has a fixed configuration. That is, the conventional filter has a single configuration that cannot be changed, unless the hardware is redesigned and replaced. But different operating circumstances and resources for a communication device or a communication system may allow or demand higher or lower performance filters. To optimize performance and resources, a need arises to provide a flexible filter for removing noise from data used for time tracking.

Once a signal is correlated and normalized, it can be compared to a threshold. Conventional methods divide correlation data by a normalizing value. However, a division operation is more difficult to implement in an electronic component. Consequently, a need arises to simplify the normalization operation of a threshold value used for time tracking.

Conventionally, a filter used for correlation data is not reset after a timing correction is made. Consequently, the filter retains and evaluates some obsolete data for a subsequent timing correction. This practice can provide incorrect timing corrections and possibly lead to timing oscillation. Overall, the conventional practice degrades system performance. Hence, a need arises for a method to avoid filtering obsolete data once a timing correction has been made.

In summary, an apparatus and a method is needed to improve the capacity, fidelity, and performance of digital communication. More specifically, a need arises for time tracking a signal generated within a mobile device to a signal received from a base station to ensure proper alignment of the signals. To improve the time tracking, a need arises to remove the noise from the correlation data used for time tracking. To optimize performance and resources, a need arises to provide a flexible filter for removing noise from pilot channel used for time tracking. Also, a need arises for a method to avoid filtering obsolete data once a timing correction has been made. Additionally, a need arises to simplify the normalization operation of a threshold value used for time tracking.

DISCLOSURE OF THE INVENTION

The present invention provides a method and apparatus for improving the capacity, fidelity, and performance of digital communication. More specifically, the present invention provides improved time tracking between a signal from a base station and a signal generated within a mobile device. The present invention improves time tracking by remove noise from the correlation data used for time tracking. To optimize performance and resources, the present invention provides a flexible filter for removing noise from correlation data used in time tracking. Additionally, the present invention provides a method to avoid filtering obsolete data once a timing correction has been made, thereby improving system performance. Additionally, the present invention provides a more efficient method of normalizing a threshold value used for time tracking.

In one embodiment, the present invention recites a method comprising several steps. In one step, a communication device, such as a cell phone, generates a first signal and receives a second signal from an outside source, such as a base station. Both signals are designed to have the same finite and repeating, but not necessarily aligned, pseudonoise (PN) sequence that can be used to synchronize the timing between the two devices. Next, correlation data between a first signal, at a plurality of timing conditions, and a second signal is generated by hardware in the communication device. The plurality of timing conditions allows an on-time condition, an early condition, and a late condition of the first signal to be evaluated for alignment with the second signal. By evaluating several timing conditions, the direction for optimal correlation between the signals can be determined. The correlation data is filtered by software or firmware at the plurality of timing-conditions to remove noise and thereby provide more accurate correlation data for subsequent evaluation. By implementing the filtering function using software or firmware, the present invention provides a very flexible and adjustable filter. For example, the filter coefficients can be quickly and inexpensively modified without hardware modifications. Thus the present invention overcomes the drawbacks of the prior art filter which was implemented in hardware.

After the filtering step, the correlation data is normalized and compared to a threshold value to obtain a result that represents the accuracy of a system timing for the first signal. One embodiment normalizes the threshold value using a more efficient multiplication operation in lieu of the conventional division operation. Specifically, the threshold value is multiplied by the on-time energy value resulting from correlation between the first signal and the second signal. This normalized threshold value is compared to the difference between the early energy and the late energy calculation resulting from correlation between the first signal to the second signal. Finally, the system timing for the first signal is corrected based upon the result of the comparing step.

In another embodiment, the present invention recites a communication device including hardware, a processor and a computer readable memory. The memory contains program instructions that, when executed via the processor, implement the aforementioned method for determining translation error in a stepper.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART

PRIOR ART

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "generating," "receiving," "filtering," "comparing," "correcting," "determining," "resetting," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

Figure 2A:
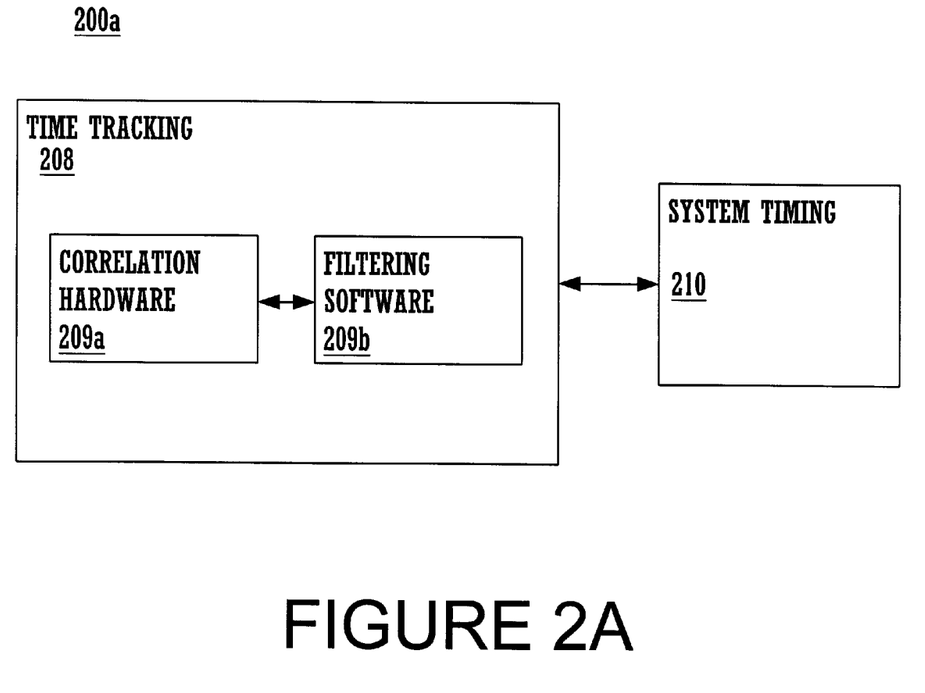
FIG. 2A is a block diagram of a communication device that performs time tracking with hardware and software, in accordance with one embodiment of the present invention.

Referring now to FIG. 2A, a block diagram of a communication device that performs time tracking with hardware and software is shown, in accordance with one embodiment of the present invention. Communication device 200a includes a time tracking block 208 coupled to a system timing block 210. Time tracking block 208 includes a correlation hardware block 209a coupled to a filtering software block 209b. By using a combination of hardware blocks, e.g. 209a, and software blocks, e.g. 209b, the present invention provides a hybrid device having optimal and flexible time tracking.

Figure 2B:
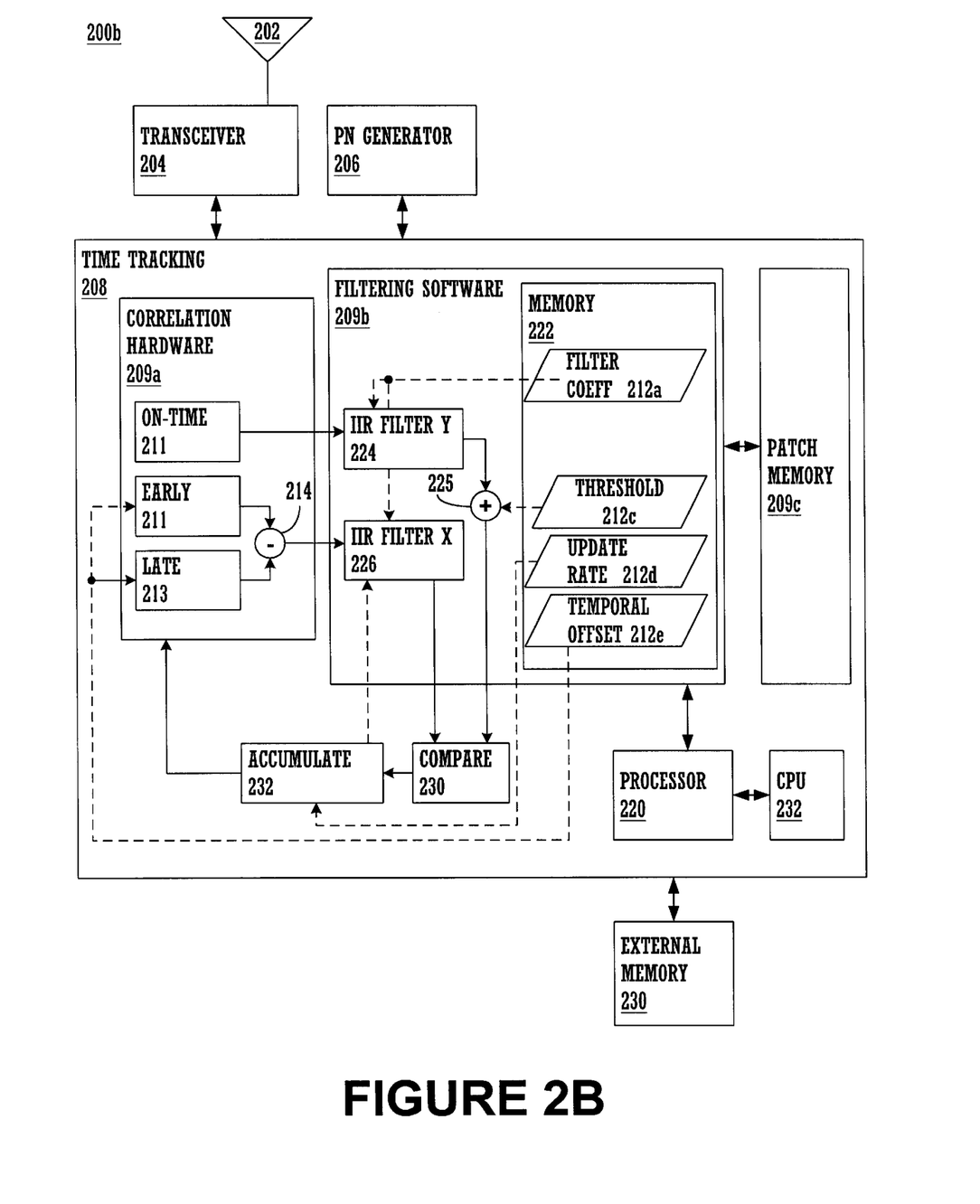
FIG. 2B is a block diagram of a communication device using filtering software for time tracking, in accordance with one embodiment of the present invention.

Referring now to FIG. 2B, a block diagram of a communication device using filtering software for time tracking is shown, in accordance with one embodiment of the present invention. Communication device 200b includes an antenna 202, a transceiver block 204, a PN generator block 206, a time tracking block 208, external memory 230, a Central Processing Unit (CPU) 232, and a processor block 220. Antenna 202 is coupled to transceiver block 204, which is in turn coupled to time tracking block 208. PN generator block 206 is also coupled to time tracking block 208. Processor 220 is coupled to time tracking block 208. CPU 232 is coupled to processor and to external memory. External memory 230 is coupled to time tracking block 208. External memory 230 can be Electrically Erasable Programmable Read Only Memory (EEPROM), flash memory, or any other type of memory configuration. In one embodiment, time tracking block 208, CPU 232, PN generator 206, and processor 220 are on-chip, while external memory 230 is off-chip. However, the present invention is well-suited to using any combination of components either on-chip or off-chip.

Time tracking block 208 of FIG. 2B includes a correlation hardware block 209a, a filtering software block 209b, and a patch block 209c coupled to each other. Time tracking block 208 also includes an accumulate block 232 and a compare block 230. Compare block 230 is coupled to filtering software block 209b and to accumulate block 232. Accumulate block is coupled to filtering software block 209b and correlation hardware block 209a. Compare block 230 and accumulate block 232 can be implemented either as hardware or software in communication device 200b. Patch block 209a can be RAM or some other form of memory device. In an alternative embodiment, if filtering software block 209b is RAM, then patch block 209c is not needed.

Correlation hardware block 209a of FIG. 2B includes a block for correlating an on-time condition 211, an early condition 212, and a late condition 213. Output from early condition block 212 and output from late condition block 213 are subtracted from each other by a block 214 that performs a logical difference operation. One embodiment implements the logical difference operation by negating one signal then adding it to the other signal.

Filtering software block 209b of FIG. 2B includes an Infinite Impulse Response (IIR) filter Y block 224, an IIR filter X block 226, a memory block 222, and a multiplication operation block 225, all coupled together. In one embodiment, memory 222 can be read only memory (ROM), including programmable and nonprogrammable ROM, e.g. firmware. In another embodiment, memory 222 can be random access memory (RAM). Memory 222 can also be any other type of memory storage, capable of containing program instructions, such as a hard drive, CD ROM, or flash memory. Memory block 222 includes data registers for filter coefficient 212a, which intrinsically indicates a filter order, threshold 212c, update rate 212d, and temporal offset 212e, for use in time tracking block 208. The present invention can include more or less data registers than those shown in the present embodiment. While the present embodiment utilizes an IIR filter, the present invention is well-suited to any kind of digital filter, e.g. a Finite Impulse Response (FIR).

Still referring to FIG. 2B, filter coefficient block 212a is coupled to IIR filter Y block 224 and IIR filter X block 226. While the present embodiment utilizes only a first-order filter, having a single coefficient, e.g. stored in coefficient block 212a, the present invention is well-suited to having a higher order filter. The higher order filter embodiment will use multiple coefficient blocks in memory to store the coefficient values. The output from IIR filer Y block and threshold data block 212c are both coupled to multiplication operation block 225. Output from IIR filter X block 226 and multiplication operation block 225 are both coupled to compare block 230. Output from compare block and update rate block 212d of memory block 222 are both coupled to accumulate block 232. Output from accumulate block 232 is coupled to IIR filter X 226 and to correlation hardware block 209a. Temporal offset block 212e of memory block 222 is coupled to early block 212 and late block 213 of correlation hardware block 209a. While the present embodiment shows a specific coupling arrangement of specific components for communication device 200b, the present invention is well-suited to using alternative embodiments. For example, PN generator block 206 can be incorporated into time tracking block 208.

Figure 2C:
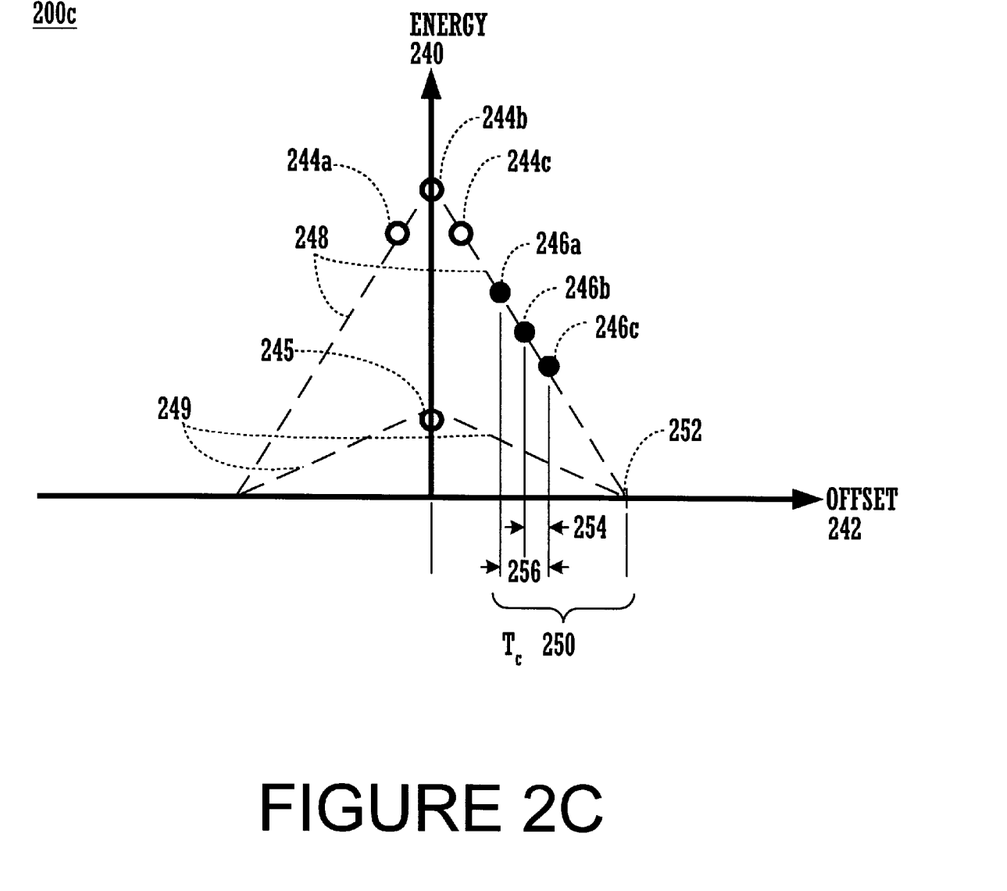
FIG. 2C is a graph of correlation data between two signals, in accordance with one embodiment of the present invention.

Referring now to FIG. 2C, a graph of correlation data between two signals is shown, in accordance with one embodiment of the present invention. Graph 200c has an abscissa axis representing the independent variable of offset 242 between two signals. Graph 200c has an ordinate axis representing the dependent variable of energy 240 calculated between the two signals over a range of offset values 242. Energy value 240 represents the correlation obtained by multiplying two signals together at corresponding times and summing the results over time. Thus, if two identical propagating signals are perfectly timed with each other over time, they would yield a large correlation value, e.g. logical high values would be accumulated and logical low values would only cancel each other and not logical high values. This is shown in graph 200c by data point 244b, which represents a zero value of offset 242, between two identical signals. In contrast, by offsetting or shifting, e.g. advancing or retarding, one or both of originally aligned signals with respect to each other, lower correlation values of 244a and 244c are obtained.

Still referring to FIG. 2C, data point 252 represents, in one embodiment, correlation between two identical propagating signals totally out of phase with each other. The offset 250 in this case is equivalent to one chip, of data for the given transmission rate in CDMA, in one embodiment. In this case, the resulting destructive interference between the two signals will essentially drive the correlation, e.g. the sum of the product of the two signals, to a mean value of zero. By these examples, correlation is illustrated as a convenient mathematical method of determining how well two signals match each other. Ideally, in one embodiment, a CDMA system needs the modulation sequence, rate, and alignment signal at one unit to be accurately timed to the demodulation sequence, rate, and alignment at another unit. By having accurate timing between these signals, data can be communicated between two or more communication devices. Points 246a, 246b, and 246c represent a series of correlation's at a consistent differential offset from each other. By examining the correlation values at different offsets, e.g. at points 246a, 246b, and 246c, it can be determined in which direction an optimal correlation value can be obtained, and thus the ideal synchronization timing. Ideally, perfect system timing is represented, in FIG. 2C, by an on-time energy value located at point 244b, a late energy value located at point 244a, and an early energy value located at point 244c.

Figure 3:
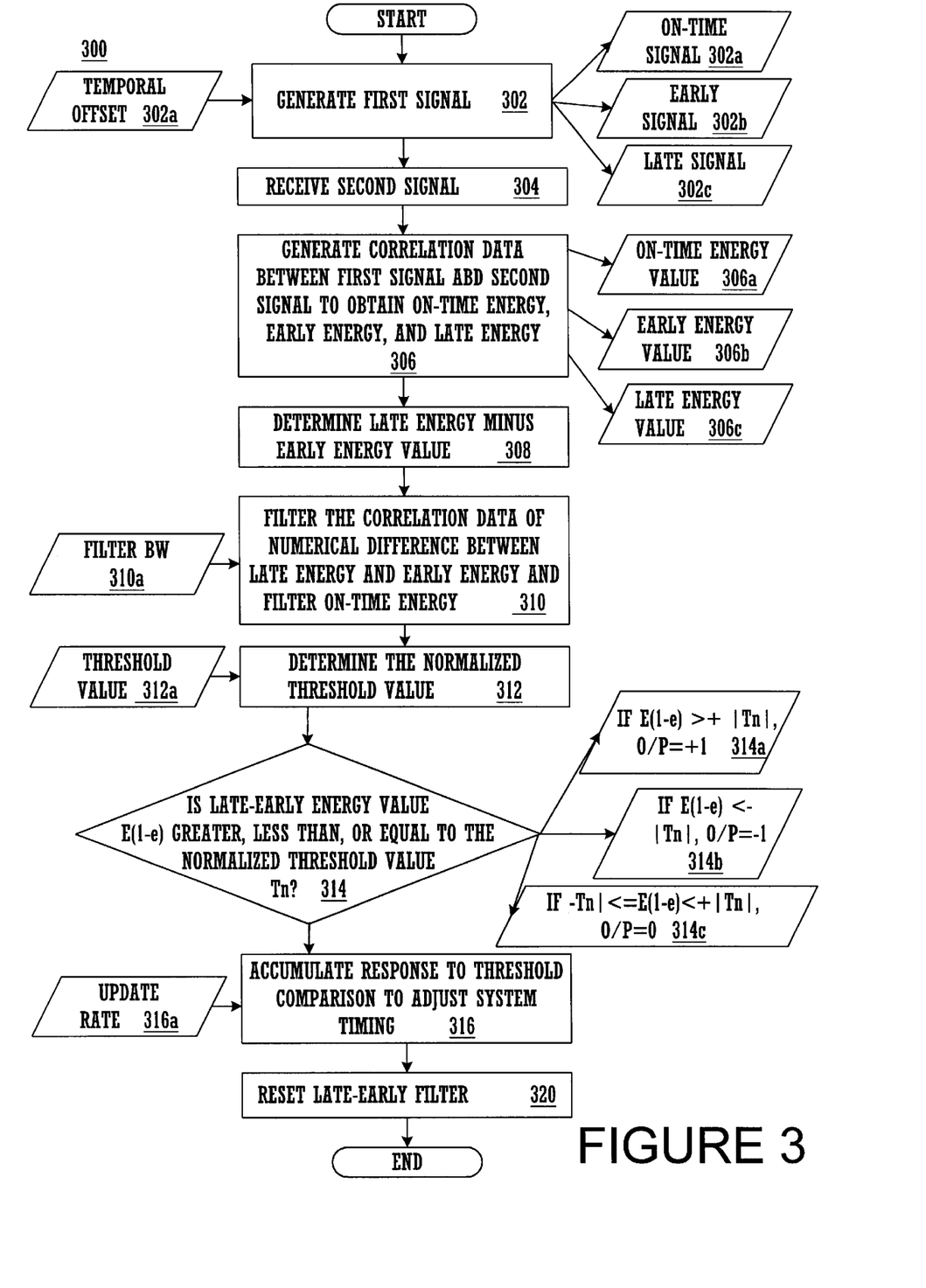
FIG. 3 is a flowchart of the steps used to implement time tracking in a communication device using hardware and software, in accordance with one embodiment of the present invention.

Referring now to FIG. 3, a flowchart of the steps used to implement time tracking in a communication device using hardware and software is shown, in accordance with one embodiment of the present invention. By using the flowchart embodiment of the present invention, a very accurate and flexible time tracking operation can be implemented. Consequently, the present invention provides improved capacity, fidelity, and performance of digital communications. While the present embodiment applies flowchart 300 to a CDMA digital communication system, the present invention can be applied to any communication system needing time tracking. Also, the present invention is applicable to both mobile units and base stations used for telecommunications operations. While the present embodiment is applied to wireless communication system, the present invention is equally applicable to coupled devices.

Flowchart 300 begins with step 302. In step 302 of the present embodiment, a first signal is generated at a communication device. Step 302 is implemented, in one embodiment, by the blocks illustrated in FIG. 2B. In one embodiment, first signal is generated by communication device 200a using methods known in the art, such as a Linear Feedback Shift Register (LFSR). However, the present invention is applicable to any signal. The PN generator block 206 can generate the first signal by many different means, such as retrieving stored memory or by evaluating an mathematical formula.

Step 302 has an input of temporal offset 302a. The temporal offset 302a determines the amount of timing offset between the early and the late version of the first signal to the on-time version of the first signal. Consequently, first step 302 provides outputs including an on-time signal 302a, an early signal 302b, and a late signal 302c. Following step 302, flowchart 300 proceeds to step 304. In one embodiment, the temporal offset value is stored in memory 222 of communication device 200b. By storing performance variables, such as temporal offset, in memory, the present invention provides the flexibility to modify the performance of the communication device by quickly and easily changing the value of the variable in memory.

In step 304 of the present embodiment, a second signal is received at a communication device. Step 304 is implemented for both an in-phase portion and a quadrature-phase portion of the second signal. Step 304 is implemented, in one embodiment, by the blocks illustrated in FIG. 2B. Specifically, digital communication system 200a receives a signal on antenna 202 in this embodiment. Typically, a second signal is transmitted between a base station and a mobile unit. However, alternative devices and configurations can be used with the present invention. The received signal is then transmitted to the time tracking block 208 for subsequent processing. With CDMA telecommunication, modulation is performed using known PN sequences. To synchronize a base station and a mobile unit, the known PN sequences are aligned. Hence, in the present embodiment, first signal and second signal are ideally the identical and timely-synchronized PN sequence. However, the present invention is also well-suited to using the present embodiment for time tracking non-identical signals. For example, noise may corrupt one of the signals such that it is similar, but not identical, to the second signal. Following step 304, flowchart 300 proceeds to step 306.

In step 306 of the present embodiment, correlation data between the first signal and the second signal is generated. Step 306, in one embodiment, receives the output from step 304, e.g. second signal, and from step 302, e.g. on-time signal 302a, early signal 302b and late signal 302c. Hence, step 306 generates correlation data between first signal, at an on-time condition, with a second signal to provide an output on-time energy value 306a. Similarly, step 306 generates correlation data between first signal, at an early timing condition, with a second signal to provide an output early energy value 306b. Lastly, step 306 generates correlation data between first signal, at a late timing condition, with a second signal to provide an output late energy value 306c. While step 306 utilizes a specific quantity and amount of timing offsets, the present invention is well-suited to any quantity of timing conditions at any amount of timing offsets.

Step 306 is implemented, in one embodiment, by the blocks illustrated in FIG. 2B. Specifically, correlation data is generated in the present embodiment by correlation hardware block 209a. That is, on-time block 211, early block 212, and late block 213 each generate their respective correlation data for the appropriate time condition. In one embodiment, blocks 211, 212, and 213 utilize quadrature despreading hardware, accumulator hardware, summer hardware, and logical-multiplication hardware to accomplish the correlation data. However, the present invention is well-suited to many different hardware combinations that can accomplish the correlation operation. Following step 306, flowchart 300 proceeds to step 308.

In step 308 of the present embodiment, a late energy value minus the early energy value is determined, thereby generating a late-early energy value. Step 308 is implemented, in one embodiment, by the blocks illustrated in FIG. 2B. Specifically, a logical subtraction device 214 can be used to find the mathematical difference between the late energy value determined by late block 213 and the early energy value determined by early block 212. Typically, the subtraction operation will be implemented using an inverter and a summing device. However, the present invention is well suited to many different devices to accomplish the logical subtraction operation. Following step 308, flowchart 300 proceeds to step 310.

In step 310 of the present embodiment, correlation data is filtered. Specifically, step 310 filters the late-early energy value, and the on-time energy value. Step 310 is implemented, in one embodiment, by the software illustrated in FIG. 2B. Specifically, filtering software 209b is utilized to filter the correlation data provided by correlation hardware block 209a. In one embodiment, the software is stored as program instructions, or code, in a computer readable memory unit, and executed, via a processor 220. In another embodiment, firmware can be used to implement a flexible filter for step 310.

FIG. 2B shows functional blocks for software filter. Specifically, filtering software block 209b provides more discrete blocks to implement the filtering function. For example, IIR filter Y block 224 filters data from the on-time signal provided by on-time block 211 in the correlation hardware block 209a. Also, IIR filter X block 226 filters data from the difference operation block 214 performed on data from the early block 212 and late block 213.

Step 310 also includes, but is not limited to, a filter bandwidth input 310a. Filter bandwidth can also be referred to as a filter coefficient, or as a forgetting factor. The quantity of filter coefficients entered for the filter intrinsically indicates the order of the filter. Filter order indicates the order of the digital filter, which indicates how many terms the filter equation utilizes. Filter bandwidth input 310a is implemented, in one embodiment, as shown in FIG. 2B, as data 212a, for filter coefficient, stored in memory 222 of communication device 200b.

By using software or firmware to implement filtering of correlating data for step 310, the present invention improves time tracking by optimally removing noise from the signal being tracked. That is, the filter design is not rigidly fixed in a hardware design like the prior art. Instead, it can easily be changed with a new data input for a filter variable such as filter bandwidth, which intrinsically includes the filter order. Any type of data storage can be utilized for data in memory 222. More specifically, by using the present embodiment, the present invention optimizes performance and resources of the communication network by providing a flexible filter for removing noise from data used in time tracking. Following step 310, flowchart 300 proceeds to step 312

In step 312 of the present embodiment, a threshold value is normalized. By normalizing the threshold value, the effect of a varying Signal to Noise Ratio (SNR) on the late-early term can be eliminated. Consequently, normalization of the threshold value emphasizes the variable of interest, the timing error between the first signal and the second signal. For example, correlation data provided in FIG. 2C indicates the correlation results of a strong signal 248, having higher energy values, and correlation results for a weak signal 249, having lower energy values. The stronger signal has a larger correlation value because the signal amplitude is high. Similarly, the weaker signal has a smaller correlation value because the signal amplitude is low. However, by normalizing the signal, e.g. dividing a signal value by another signal value, a unitless and relative result is obtained that makes evaluation of a strong and weak signals compatible. Instead of dividing one energy value by another to normalize it, the present embodiment multiplies the threshold value by one energy value to provide the same effect. That is, the normalized threshold value is defined as the threshold value multiplied by the on-time energy value.

A specific example is provided to describe the need for normalization. In FIG. 2C, the temporal distance 256 represents the difference between late energy and early energy, e.g. $E_{L-E}$. However, as shown in FIG. 2C, the Signal to Noise (SNR) ratio affects the results of $E_{L-E}$. That is, the difference in energy value between point 246a and 246c is greater for a strong signal, e.g. represented by curve 248, than for a weak signal, e.g. represented by curve 249. When compared to a fixed threshold value, e.g. T, the SNR difference inaccurately affects the timing error analysis and correction. Thus, to eliminate the dependency of the $E_{L-E}$ from the SNR, a term must be normalized. In the present embodiment, the threshold value, T, is essentially normalized by multiplying it by the on-time energy value to obtain a normalized threshold value, $T_N$. However, the same result is obtained whether using the conventional method of dividing two values, or the present embodiment method of multiplying two different values, as described herein. But while the present embodiment performs a multiplication operation, while the prior art performed a division operation, the results are the same. For example, if variable $E_{L-E}$ is normalized by dividing it by variable $E_{TO}$, the on-time energy value, and compared to a threshold T, then the following equations of 1) and 2) are mathematically equivalent. The equations are: 1) $(E_{L-E}/E_{OT})$ vs. T; and 2) $E_{L-E}$ vs. $(E_{OT}*T)$. The normalized threshold term $(E_{OT}*T)$ is represented by $T_N$.

Step 312, in one embodiment, includes, but is not limited to, a threshold value 310a input, and an on-time energy value, obtained from step 306. Step 312 may be implemented, in one embodiment, by the software and hardware illustrated in FIG. 2B. Specifically, threshold value input 310a for flowchart 300 is implemented in the embodiment of FIG. 2B, as data 212c stored in memory 222 of filtering software block 209b for communication device 200a.

Step 312 is implemented in one embodiment, as shown in FIG. 2B, where a logical multiplication block 225 multiplies data from IIR filter Y 224 and from threshold data 212c stored in memory 222. By using a multiplication operation instead of a conventional division operation for the normalizing step, the present invention provides a faster and easier implementation of the normalizing step. A normalized threshold Following step 312, flowchart 300 proceeds to step 314.

In step 314 of the present embodiment, an inquiry determines whether the late-early energy value is greater than, less than, or equal to the normalized threshold value. More specifically, if the late-early energy value is greater than the absolute value of the normalized threshold value, e.g. $E_{L-E}$, $>|T_N|$, an output 314a of "+1" is generated. If the late-early energy value is less than the negated absolute normalized threshold value, e.g. $E_{L-E}$,$<-|T_N|$, then an output 314b of "−1" is generated. Finally, if the late-early energy value is less than, or equal to, the absolute value of the normalized threshold value and greater than, or equal to, the negated absolute value of the normalized threshold value, e.g. $-|T_N|<E_{L-E}$,$<|T_N|$, then an output 314c of "0" is generated. While the present embodiment provides a pecific numeric value for a given condition, the present invention is well-suited to sing any consistent output value for each of the different results of the inquiry. Step 301 is implemented, in one embodiment, by the hardware illustrated in FIG. 2B. Specifically, compare block 230 evaluates the normalized threshold data provided by logical multiplication block 225, and it evaluates the filtered late-early energy value data provided by IIR filter X block 226. Compare block 230 can be implemented as software or as hardware. Following step 314, flowchart 300 proceeds to step 316.

In step 316 of the present embodiment, responses to the inquiry of step 314 are accumulated to adjust system timing. Step 316 is implemented, in one embodiment, by the blocks illustrated in FIG. 2B. Specifically, accumulate block 232 accumulates responses from compare block 230. In one embodiment, the system timing is adjusted in a separate step in response to the accumulated responses to step 314 and the update rate 316a enabling input. In one embodiment. input 316a is implemented by the embodiment of FIG. 2B as memory block 212d. Accumulate block 232 receives an update rate 212d from memory 222 of communication device 200b. The update rate dictates how often the frequency of the first signal is corrected in response to the results of comparison step 314.

In one embodiment, the adjustment to the first signal of step 316 is responsive to the results of the comparison step 314. Specifically, if the accumulated data in step 316 indicates a "+1" from the comparison, then system timing for the first signal is retarded. If the accumulated data in step 316 indicates a "−1" from the comparison, then system timing for the first signal is advanced. And if the accumulated data in step 316 indicates a "0" from the comparison, then system timing for the first signal is unchanged. The present invention is well-suited to alternative control mechanisms than those used in the present embodiment, such as different codes other than +1,−1, and 0.

Step 316 is implemented, in one embodiment, by the blocks shown in FIG. 2B. Specifically, accumulate block 232 is coupled to, and provides the system timing changes to, correlation block 209a. Time tracking block is coupled to PN generator block 206, and thus can pass system timing changes to it. Accumulate block 232 can be implemented either as hardware or as software. Following step 316, flowchart 300 proceeds to step 320.

In step 320 of the present embodiment, the late-early filter, e.g. used to filter the numerical difference between late energy value minus early energy value, is reset. Step 320 is implemented, in one embodiment, by the blocks shown in FIG. 2B. Specifically, IIR filter X block 226 is reset. Specifically, IIR filter X block 226 filters the values resulting from subtracting late energy from early energy. This step is shown figuratively by coupling accumulate block 232 to IIR filter X block 226 by a dashed line. In one embodiment, resetting the filter is implemented by zeroing out previous output values considered by an IIR filter. Alternatively, previous values of input considered by an FIR filter are zeroed out. Following step 320, flowchart 300 ends.

Many of the instructions for steps and the data stored in memory 222 for flowchart 300, are executed using processor 220. The memory storage for the present embodiment can either be permanent, such as read only memory (ROM), or temporary memory such as random access memory (RAM). Memory 222 can also be any other type of memory storage, capable of containing program instructions, such as a hard drive, a CD ROM, or flash memory. Furthermore, processor 220 can either be an existing system processor, or it can be a dedicated digital signal processing (DSP) processor. Alternatively, the instructions may be implemented using a microcontroller or some other state machine.

Because the time tracking process shown by flowchart 300 uses data stored as software, the present invention provides dynamic time tracking and/or dynamic filtering. For example, inputs used in flowchart 300 can be stored in memory. Thus, their values can be changed, in one embodiment, without changing hardware components in the communication device. Data can be loaded into memory, e.g. 222, of communication device 200b of FIG. 2B, e.g. mobile unit or base station unit, at the time of manufacture or during service. To implement changes to time tracking during service of the communication device, new performance values can be transmitted with system information to the communication device. This embodiment can be implemented as shown in FIG. 2B where antenna 202 can receive a system data signal from another device, such as a base station. The system data signal is demodulated by the transceiver 204 and communicated to the time tracking block 208. Appropriate data values from the system data signal can be stored in memory block 222 of filtering software 209b. In this manner, time tracking and/or filter performance of a unit can be varied quickly, easily, and transparently to the user. This embodiment could provide tailored filtering for communication devices based on variables such as geographical location that would account for electromagnetic interference levels, signal traffic, physical obstructions, and other considerations. This embodiment can be implementing, as shown in FIG. 2B. If filtering software 209b is stored in Random Access Memory (RAM), then the filter inputs and instructions can simply be rewritten over previous RAM data. The new inputs and instructions can come from external memory, e.g. external memory 230, or from an external input device.

Alternatively, if filtering software 209b is stored in Read Only Memory (ROM), inputs and instructions for the filter can be downloaded from an external memory device, e.g. external memory 230, such as flash memory or Electrically Erasable Programmable Read Only Memory (EEPROM), to on-chip memory, e.g. patch memory 209c. Instructions and data on patch memory 209c are subsequently implemented in time tracking block 208 in lieu of those provided by filtering software 209b. Alternatively, the communication device may be modified by mechanically linking and downloading new data to the communication device.

While flowchart 300 of the present embodiment shows a specific sequence and quantity of steps, the present invention is suitable to alternative embodiments. For example, not all the steps provided for flowchart 300 are required for the present invention. And additional steps may be added to those presented. Likewise, the sequence of the steps can be modified depending upon the application. Furthermore, while flowchart 300 is shown as a single serial process, it can also be implemented as a continuous or parallel process. For example, instead of proceeding to end step, flowchart 300 could return to the start step or to step 310, in different embodiments, to continuously perform correlation and/or filtering operations.

Figure 4A:
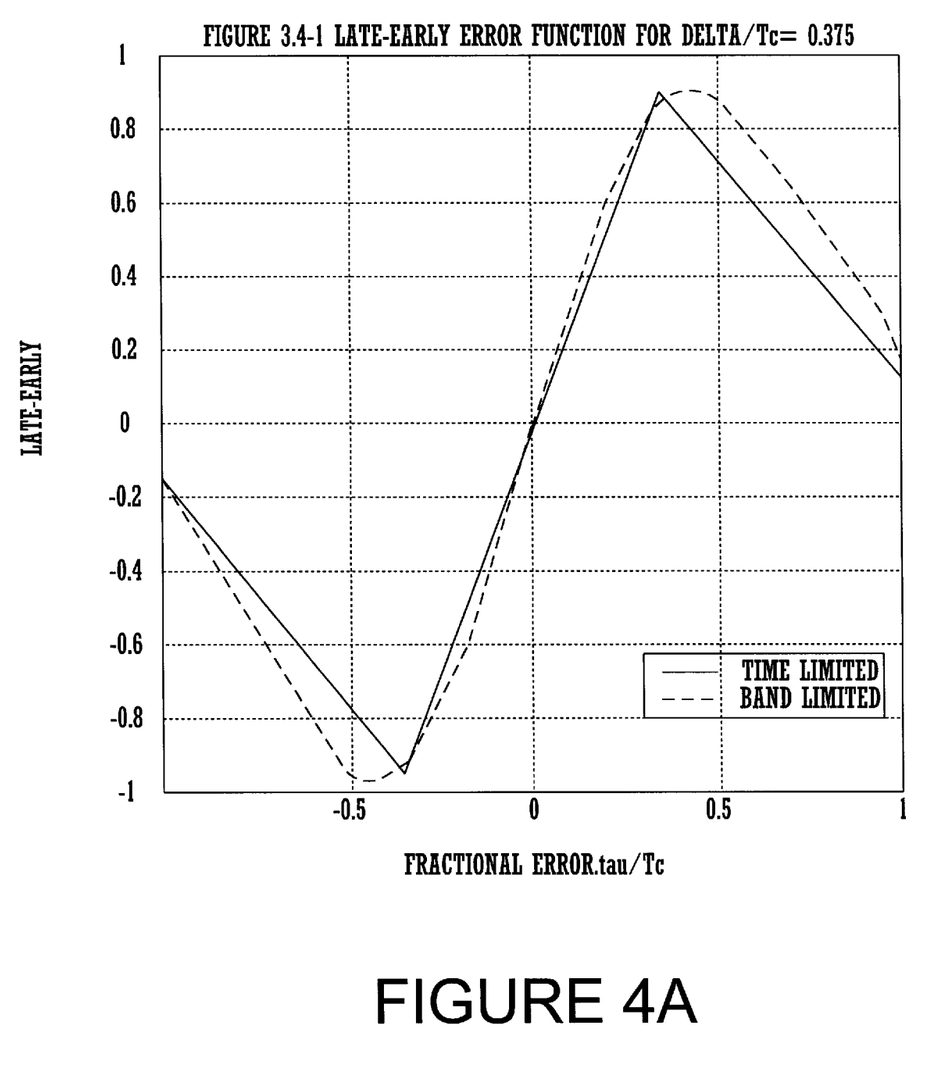
FIG. 4A is a graph of the error function versus a non-normalized lateearly pilot energy, in accordance with one embodiment of the present invention.
Figure 4B:
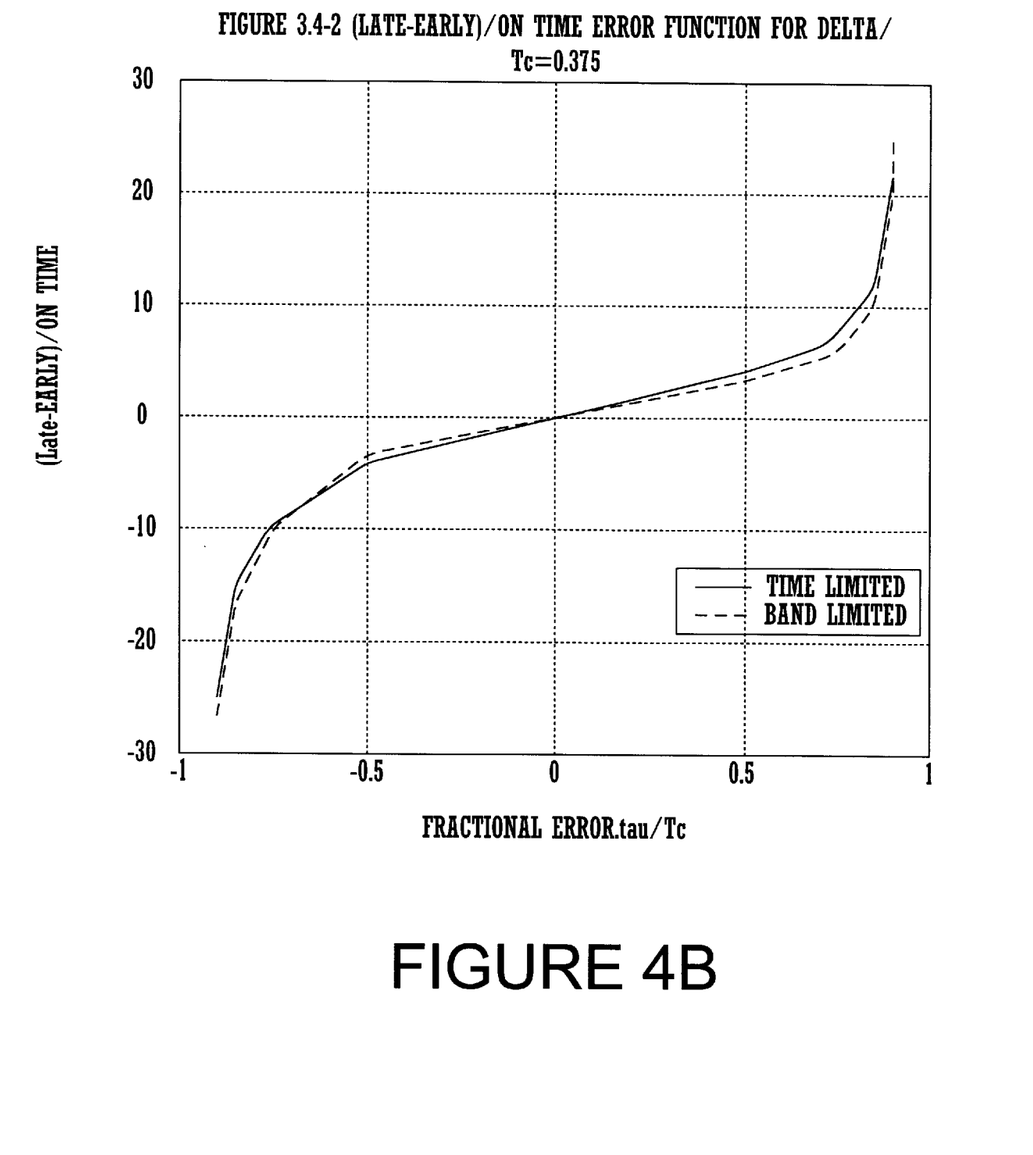
FIG. 4B is a graph of the error function versus a normalized late-early pilot energy, in accordance with one embodiment of the present invention.

Referring now to FIGS. 4A–4B, graphs of the error function versus normalized and non-normalized late-early pilot energy is shown, in accordance with one embodiment of the present invention. The graphs shown are based on the mean value for the difference between early and late pilot energy, e.g.:

$$E[Z(\tau)] = E[Z_-] - E[Z_+] = N^2 E_c[R(\tau-)^2 - R(\tau+)^2]$$

where $E[Z(\tau)]$ is the expected, or mean, value of the difference between late and early pilot energy, $E[Z_-]$ is the expected, or mean, late pilot energy, $E[Z_+]$ is the expected, or mean, early pilot energy, $R(\tau)$ is the autocorrelative function, $\tau$ is the timing error, and is the distance between late/early to one time (e.g. ⅜ of chip time).

FIG. 4A shows the normalized function of $E[Z(\tau)]$ with=⅜ chip time ($T_c$). Note that as $\tau$ gets closer to $T_c$, the difference between late and early pilot energy diminishes. FIG. 4B shows the expected function of (Late-Early)/(On time) of the pilot energy as a function of timing error and=⅜ chip time ($T_c$). For a system sampling period of ⅛ $T_c$, decision threshold should be $\tau$=¹⁄₁₆ $T_c$=0.0625 $T_c$. In one embodiment, the decision threshold output is between 0.1778 and 0.2108. However, the present invention is well-suited to using a wide range of decision thresholds between 0 and 1.

The digital filter bandwidth is proportional to the update rate in one embodiment. With an update rate of once per 20 millisecond, e.g. 50 Hz, the digital filter −1 dB bandwidth should be around 50 Hz. However, the present invention is suitable to using a wide range of update rates, or to using a real time configuration. Optimal bandwidth can be determined by using Signal Processing Workstation (SPW) to simulate both Additive White Gaussian Noise (AWGN) and fading environment. The purpose of using an update rate is to control when the system timing can be changed. By providing a time delay between modifications to system timing, the present embodiment allows the system to stabilize before making a subsequent change. In other words, the system timing and the present time tracking and updating blocks act as a control system. To prevent unwanted corrections that might lead to oscillations between overcorrecting and undercorrecting system timing, the present embodiment only allows changes when the update rate allows it to. In an alternative embodiment, the present invention is well-suited to using a real time updating system as well. However, system response time, lead time, and lag time, and reaction time in general, can be considered in using an update rate configuration or a real-time update configuration.

In view of the embodiments presented herein, the present invention effectively provides a method and apparatus for improving the capacity, fidelity, and performance of digital communication. More specifically, the present invention provides improved time tracking between a signal from a base station and a signal generated within a mobile device. The present invention also improves time tracking by remove the noise from the correlation data used for time tracking. To optimize performance and resources, the present invention provides a flexible filter for removing noise from correlation data used in time tracking. Also, the present invention provides a method to avoid filtering obsolete data once a timing correction has been made, thereby improving system performance. Additionally, the present invention provides a more efficient method of normalizing a threshold value used for time tracking.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a communication device, a method of providing time tracking between a first signal and a second signal, comprising:
    a) generating the first signal by the communication device;
    b) receiving the second signal at the communication device from an outside source;
    c) generating correlation data between the first signal, at a plurality of timing conditions, and the second signal, the correlation data generated by hardware;
    d) filtering the correlation data, to remove noise, at the plurality of timing conditions, the filtering step performed using at least a first-order filter implemented in software or firmware;
    e) comparing the correlation data to a threshold value to evaluate accuracy of a system timing for the first signal, and thereby obtain a result;
    f) correcting the system timing for the first signal based upon the result of the comparing step;
    wherein the plurality of timing conditions for the first signal include an one-time condition, a late condition, and an early condition;
    wherein step (c) comprises:
        c1) determining an on-time energy value between the first signal, at the on-time condition, and the second signal;
        c2) determining a late energy value between the first signal, retarded to the late condition, and the second signal; and
        c3) determining an early energy value between the first signal, advanced to the early condition, and the second signal;
    g) calculating a late-early energy value, the late-early energy value equal to a difference between the late energy value and the early energy value;
    h) receiving the threshold value;
    i) determining a normalized threshold value; and
    j) comparing the late-early energy value with the normalized threshold value to obtain the result.

2. The method recited in claim 1 wherein said step i) further comprises the step of multiplying said threshold value by a normalizing value to obtain said normalized threshold value.

3. The method recited in claim 2 wherein said normalizing value is said on-time energy value.

4. The method recited in claim 3 further comprising the step of:
    k) resetting, after correcting said system timing, said at least first-order filter used for said correlation data at said late timing condition and at said early timing condition.

5. The method recited in claim 1 wherein filtering is implemented with an infinite impulse response filter.

6. The method recited in claim 4 wherein steps d) through k) are implemented using software or firmware.

7. The method recited in claim 1 further comprising:
    adjusting the time tracking dynamically by changing data located in software or firmware.

8. The method recited in claim 7 wherein said adjusting step changes filter-related performance data located in software or firmware.

9. The method recited in claim 8 wherein said adjusting step changes the filter coefficients located in software or firmware.

10. The method recited in claim 1 further comprising:
    filtering the late-early energy value with a single filter.

11. An article of manufacture, comprising:
    a substrate having first instructions embedded therein;
    wherein when executed by a processor, the first instructions cause the processor to perform the time tracking operations of:
    generating a first signal by the communication device;
    receiving a second signal at the communication device;
    determining, in hardware, with respect to the first signal and the second signal, an on-time energy value, a late energy value, and an early energy value, the on-time, late, and early energy values forming correlation data;
    filtering the correlation data, to remove noise, the filtering performed using at least a first-order filter implemented in software or firmware;
    comparing the correlation data to a threshold value to evaluate accuracy of a system timing for the first signal, and thereby obtain a result;

correcting the system timing for the first signal based upon the result;

calculating a late-early energy value, the late-early energy value equal to a difference between the late energy value and the early energy value;

receiving the threshold value;

determining a normalized threshold value; and comparing the late-early energy value with the normalized threshold value to obtain the result.

12. The article of manufacture of claim 11, further comprising a communication device coupled to the substrate.

13. The article of manufacture of claim 12, wherein the communication device is adapted to operate in a CDMA communication system.

14. The article of manufacture of claim 13, wherein the substrate further has second instructions embedded therein;

wherein when executed by the processor, the second instructions cause the processor to perform the operation of:

multiplying the threshold value by a normalizing value to obtain the normalized threshold value.

15. The article of manufacture of claim 14, wherein the normalizing value is the on-time energy value.

16. The article of manufacture of claim 15, wherein the substrate further has third instructions embedded therein;

wherein when executed by the processor, the third instructions cause the processor to perform the operation of:

resetting, after correcting the system timing, the at least first-order filter.

17. The article of manufacture of claim 16, wherein the at least first-order filter comprises a infinite impulse response filter.

18. The article of manufacture of claim 15, wherein the substrate further has fourth instructions embedded therein;

wherein when executed by the processor, the fourth instructions cause the processor to perform the operation of:

adjusting the time tracking dynamically.

* * * * *